US012745787B2

(12) United States Patent
Kuei et al.

(10) Patent No.: US 12,745,787 B2

(45) Date of Patent: Sep. 29, 2026

(54) PROCESS FOR COOKING GRAINS

(71) Applicant: OSI Industries, LLC, Aurora, IL (US)

(72) Inventors: Chuhan Kuei, Naperville, IL (US); Alyssa Nishijima, Montgomery, IL (US); Long Trieu, Chicago, IL (US)

(73) Assignee: OSI Industries, LLC, Aurora, IL (US)

( * ) Notice: Subject to any disclaimer, the term of this patent is extended or adjusted under 35 U.S.C. 154(b) by 245 days.

(21) Appl. No.: 18/640,550

(22) Filed: Apr. 19, 2024

(65) Prior Publication Data

US 2024/0365822 A1 Nov. 7, 2024

Related U.S. Application Data

(60) Provisional application No. 63/460,345, filed on Apr. 19, 2023.

(51) Int. Cl.

| | |
|---|---|
| ***A23L 7/196*** | (2016.01) |
| ***A23L 5/10*** | (2016.01) |
| ***B65B 5/06*** | (2006.01) |
| ***B65B 25/22*** | (2006.01) |

(52) U.S. Cl.

CPC ............... *A23L 7/1965* (2016.08); *A23L 5/13* (2016.08); *A23L 5/17* (2016.08); *A23L 5/19* (2016.08); *B65B 5/067* (2013.01); *B65B 25/22* (2013.01)

(58) Field of Classification Search

CPC . A23L 7/1965; A23L 5/19; A23L 5/13; A23L 5/17; B65B 5/067; B65B 25/22

USPC .......................................................... 426/618

See application file for complete search history.

(56) References Cited

U.S. PATENT DOCUMENTS

2017/0367381 A1* 12/2017 Howard ................ A23L 7/1975

* cited by examiner

*Primary Examiner* — Brent T O'Hern

(74) *Attorney, Agent, or Firm* — UB Greensfelder LLP; Richard C. Himelhoch

(57) ABSTRACT

A process for cooking grains in a bag having an air and moisture barrier is provided. The process includes filling a portion of the bag with a type of grain, such as rice, adding brine to the bag and leaving a headspace of air in the bag to enable the grain to expand as it is being cooked. The process further includes sealing the bag and placing the bag in a cooking device. The grain can be cooked in the bag by submerging the bag in hot water. The grain can also be cooked in a cabinet having various heat sources, a rotary drum or a continuous cooking device. The grain cooked by this process comes out loose and fluffy, and is not congealed. The process can be used for rice, oats and other grains.

20 Claims, 8 Drawing Sheets

PROCESS FOR COOKING GRAINS

CROSS-REFERENCE TO RELATED APPLICATIONS

The present invention claims priority to and the benefit of U.S. Provisional Patent Application No. 63/460,345 filed Apr. 19, 2023, the contents of which are incorporated herein by reference and made a part hereof.

FEDERALLY SPONSORED RESEARCH OR DEVELOPMENT

N/A

FIELD OF THE INVENTION

The present application is directed to a process for cooking grains in a sealed loose package with a brine and water that results in loose and fluffy cooked grains.

DESCRIPTION OF THE PRIOR ART

Traditionally, grains are open cooked in water so that they can absorb moisture and expand during cooking. There are problems with other methods for cooking grains. For example, in a sous vide style process (i.e., vacuum cooking in a bag), the grains could not expand properly during cooking. The grains could also congeal into blocks due to starch gelatinization.

Current "cook in water" products in the market cook grains in perforated bags that are submerged in boiling water. The water is then drained from the bag after cooking. However, cooked grains in this manner, or grains that are packed after being cooked can experience post thermal process contamination issues, and physical and/or chemical intervention is needed to prolong a refrigerated shelf life of the product.

The present invention provides a method for cooking grains in a bag without perforations that provides a fluffy cooked product.

SUMMARY OF THE INVENTION

The present invention is generally directed to a process for cooking grains, such as rice, oats etc., in a sealed loose package that cooks the grains in a manner to provide an appealing product without concern for contamination if the product is maintained in the bag. The cooked grains are loose and fluffy and are not congealed together. Additionally, the product has long refrigeration shelf life without additional chemical or physical intervention.

In accordance with one aspect of the invention, a process for cooking grains comprises providing a bag having an air and moisture barrier, and placing uncooked grains in the bag. The process further includes placing brine in the bag and providing a head space filled with air in the bag to provide space for the grains to expand during cooking. The process also includes sealing the bag and cooking the grains in the bag. The steps of placing uncooked grains in the bag, placing brine in the bag, providing a head space filled with air in the bag to provide space for the grains to expand during cooking, and sealing the bag are performed in a packaging machine.

The step of cooking the grains in the bag can comprise submerging the bag in hot water. Alternatively, the step of cooking the grains in the bag comprises placing the bag on a rack in a cabinet and exposing the bag to steam, hot air or a hot water fall.

In another alternative, the step of cooking the grains in the bag comprises placing the bag in a rotating and agitating cooking device. The rotating and agitating cooking device can be a rotary drum cooker.

In yet another alternative, the step of cooking the grains in the bag comprises placing the bag in a continuous cooking system having multiple cooking zones. The continuous cooking system can include bag flipping capability and the process further comprises flipping the bag between the cooking zones.

The grain is completely cooked in the bag and then refrigerated in the sealed bag. The grain can be rice or oats or other similar grains.

In accordance with another aspect of the invention, a process for cooking grains in a bag to provide a loose and fluffy cooked grain product is provided. The process comprises providing a packaging machine and providing a bag having an air and moisture barrier. The process further includes filling a portion of the bag with a grain using the packaging machine, filling a portion of the bag with brine using the packaging machine, leaving a portion of the bag with only air, and sealing the bag using the packaging machine. The process further includes providing a cooking device and cooking the grain in the bag in the cooking device.

The step of providing a cooking device can include providing a rotating cooking device. Alternatively, the step of providing a cooking device can include providing a continuous cooking device with multiple cooking zones or providing a cabinet with racks for one of cooking by steam, hot air and a hot water fall.

The step of filling a portion of the bag with a grain using the packaging machine includes filling the bag with rice or oats or other similar grain product.

Other features and advantages of the invention will be apparent from the following specification taken in conjunction with the following Figures.

BRIEF DESCRIPTION OF THE SEVERAL VIEWS OF THE DRAWINGS

To understand the present invention, it will now be described by way of example, with reference to the accompanying drawings in which.

DETAILED DESCRIPTION

Figure 1:
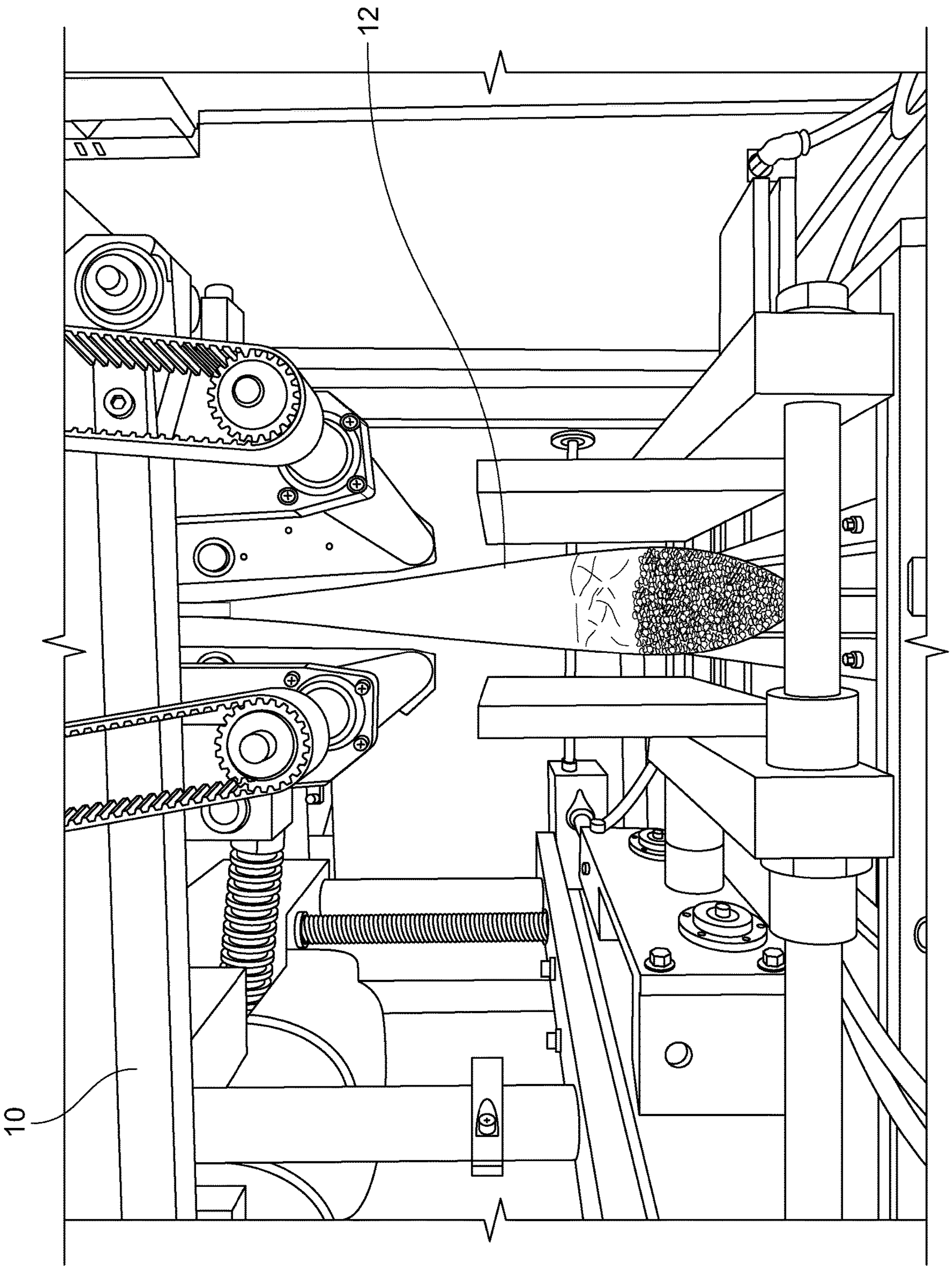
FIG. 1 is a perspective view of a bag of grain on a packaging machine in accordance with present process.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

The present invention provides a method for cooking grains in a sealed loose package or bag that results in a loose, fluffy cooked product. The cooked bag has a long refrigerated shelf life without the need for chemical or physical intervention to prevent contamination of the grain in the bag.

FIG. 1 shows a packaging machine 10 for filling a bag 12 in accordance with an aspect of the present invention. The bag is made from a material (e.g., plastic or other similar or suitable material) having air and moisture barrier properties.

The packaging machine 10 fills only a portion of the bag 12 with a grain 14 product. The packaging machine 10 also fills only a portion of the bag 12 with a brine and water mixture 16. The remainder of the bag 12 is left empty, that is, the bag 12 is left with only air in it. In some instances, air (or possibly other gases) can be forced into the bag 12. The bag 12 is then completely sealed, again, leaving a portion of the bag 12 just filled with air. Importantly, the bag 12 is not vacuum sealed as is done in some other cooking methods. This is because the extra space in the bag 12 is provided to allow the individual grains 14 to expand as they absorb the brine and water mixture.

Figure 2:
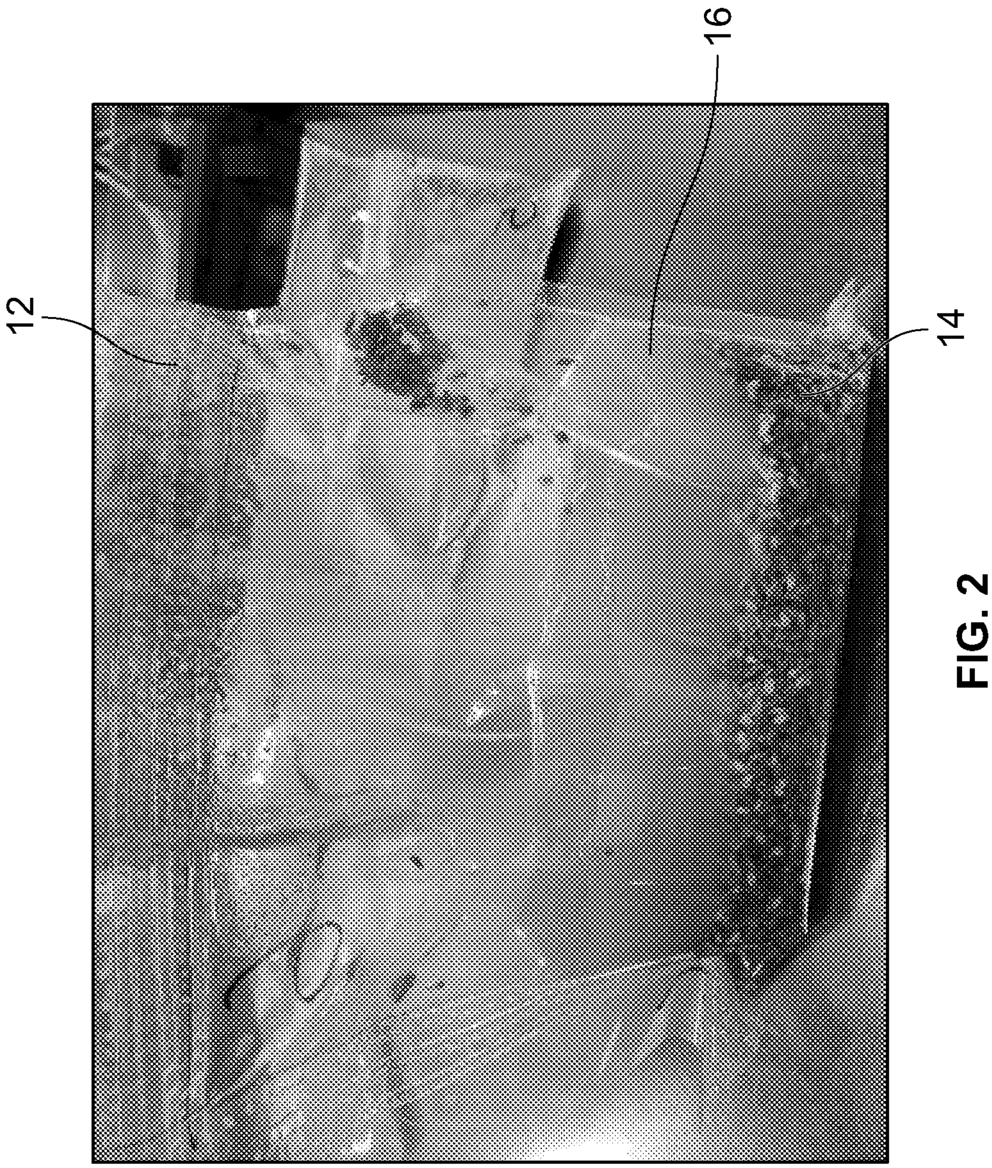
FIG. 2 is a perspective view of a sealed bag filled with grain, brine/water and air formed on the packaging machine.

FIG. 2 shows a sealed bag 12 in accordance with the invention. The sealed bag 12 contains grain 14, brine and water mixture 16 and air. As is evident, the grain 14 and brine and water mixture 16 only take up a portion of the bag 12.

Figure 3:
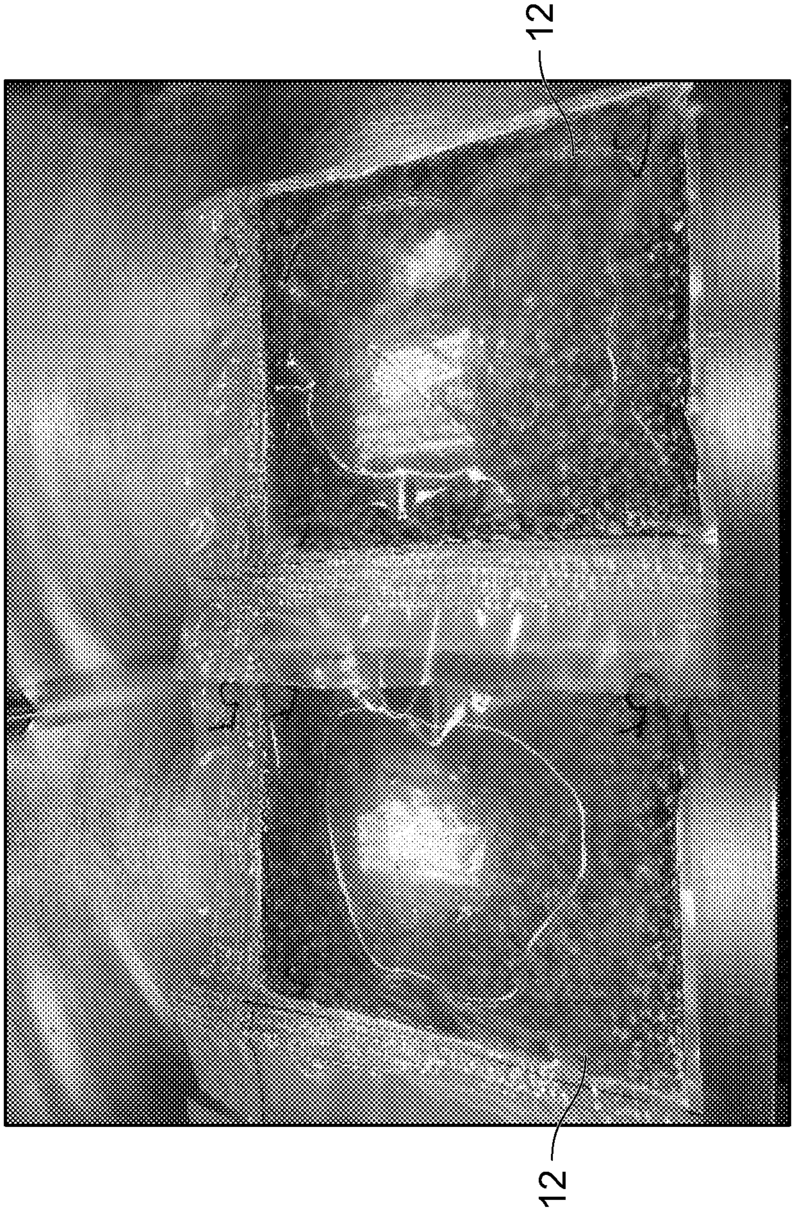
FIG. 3 is a perspective view of two bags lying flat.

FIG. 3 shows two bags 12 containing grain 14, a brine and water mixture 16 and air lying flat on a surface.

The grain 14 in the bag 12 can then be cooked in a number of ways. For example, the bag 12 can be submerged in hot or boiling water in a pot.

Figure 4:
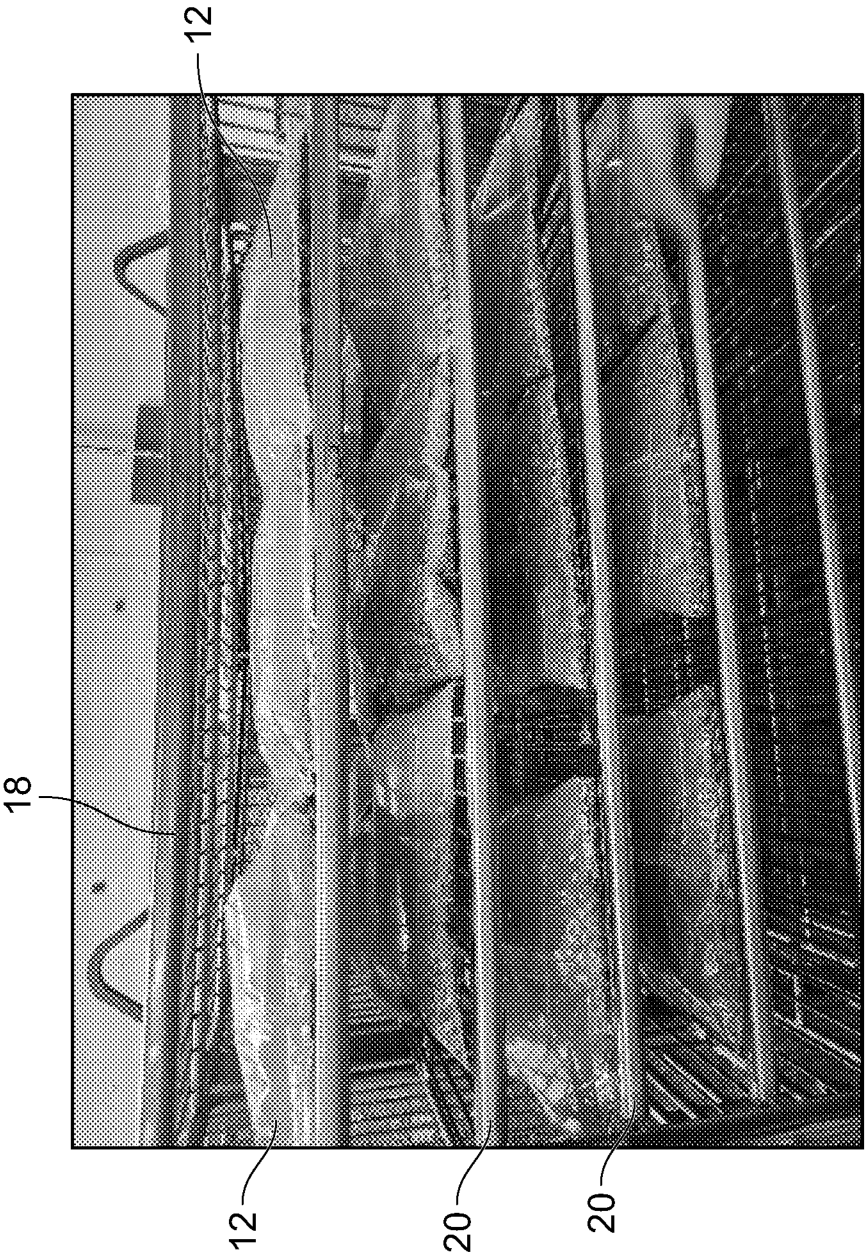
FIG. 4 is a perspective view of a plurality of bags filled with grain, brine/water and air on a rack for cooking in a cabinet.

FIG. 4 shows a plurality of bags 12 containing grain 14, brine 16 and air on a rack 18 having a plurality of shelves 20. The rack 18 can be placed in a cabinet having various heat sources for cooking the grain 14. For example, the bags 12 on the rack 18 can be exposed to steam, hot air, hot water falls, etc.

Figure 5:
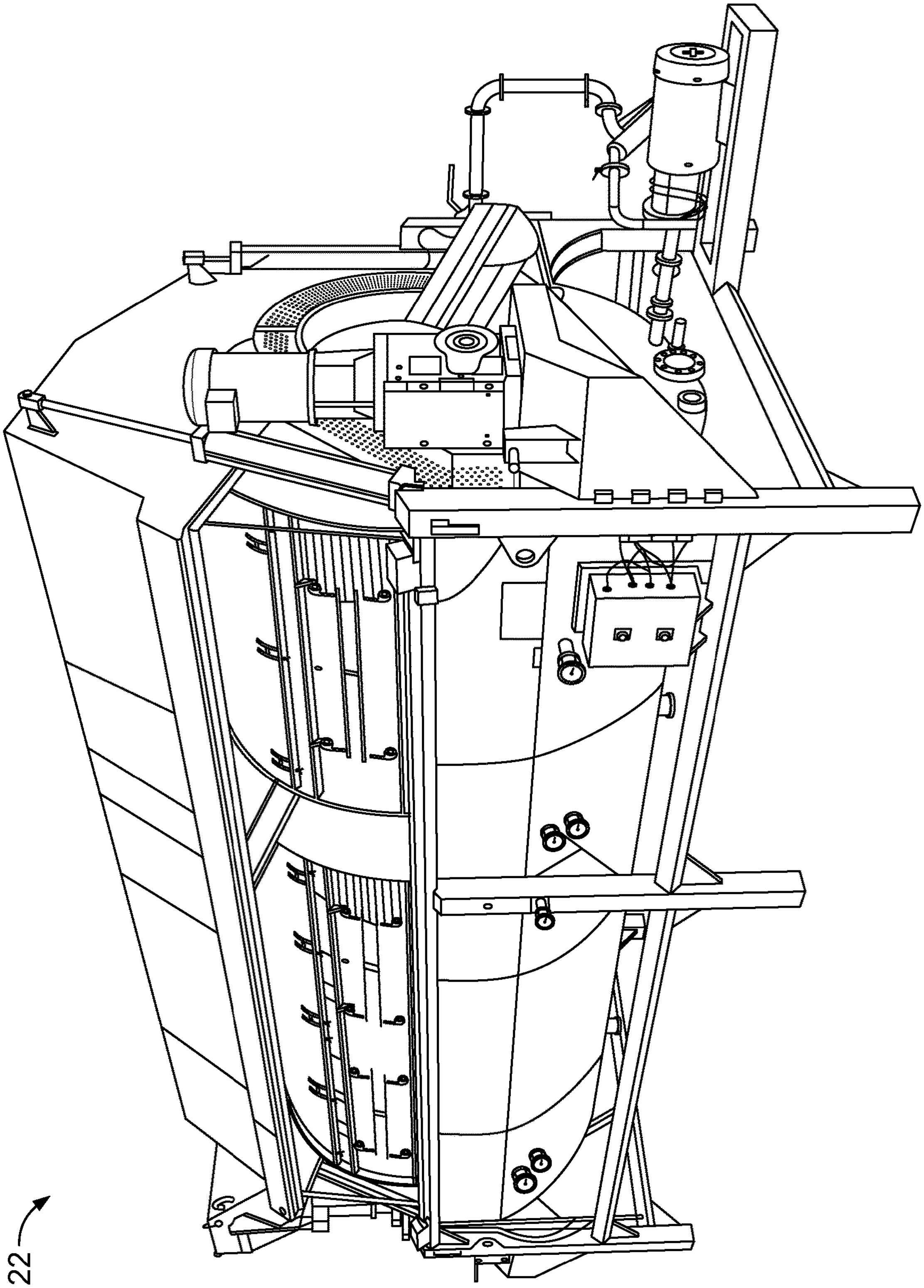
FIG. 5 is a perspective view of a rotary drum for cooking the bags of grain.

In a static cooking method like that shown in FIG. 4, the grain 14 will absorb the brine and water mixture 16 during the cooking process. The top layer of grains can rise (i.e., grow/expand) above the water line as they begin to absorb the brine and water mixture 16, and then will only be cooked by steam in the bag 12, while the lower layers are still under brine and water mixture 16 and will thus be cooked by the hot brine and water mixture 16. Accordingly, it is advantageous to rotate or flip the bags 12 during the cooking process to minimize any variation to the grain 12 due to the different cooking processes effecting the various layers. A Lyco rotary drum cooker 22, as shown in FIG. 5 can be used to rotate the bags during the cooking process.

Figure 6:
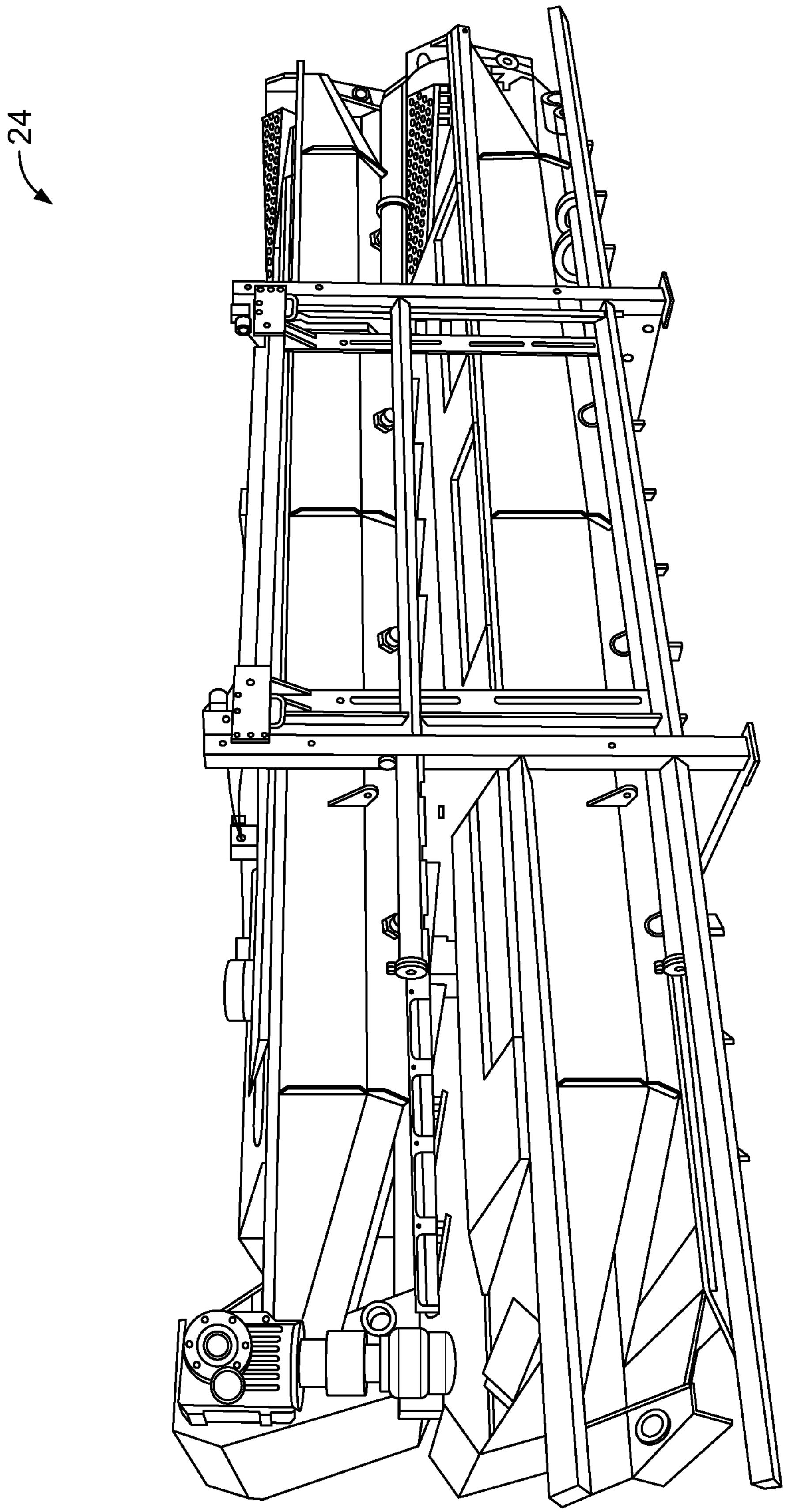
FIG. 6 is a perspective view of a continuous multiple zone cooking device with flipping capability for cooking the bags of grain; and, FIG. 7 and FIG. 8 are perspective views of loose, fluffy grain and rice in accordance with the present process.

Alternatively, a cooker with multiple cooking zones and flipping capability can be utilized. A Marlen double zone continuous cooker 24 with such bag flipping capability is shown in FIG. 6.

Figure 7:
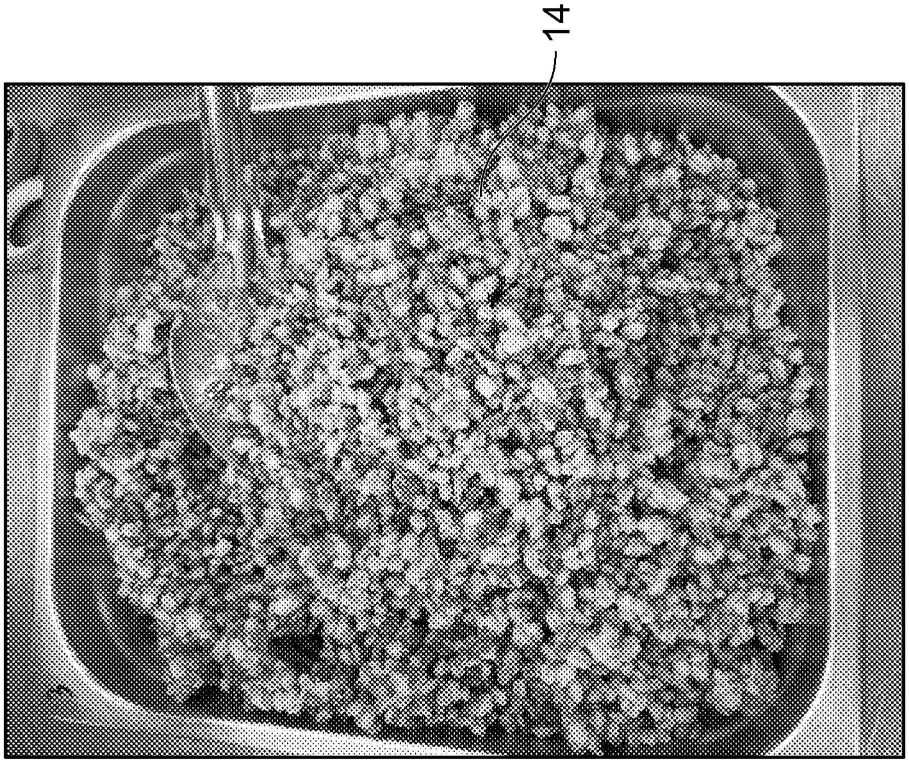
Figure 8:
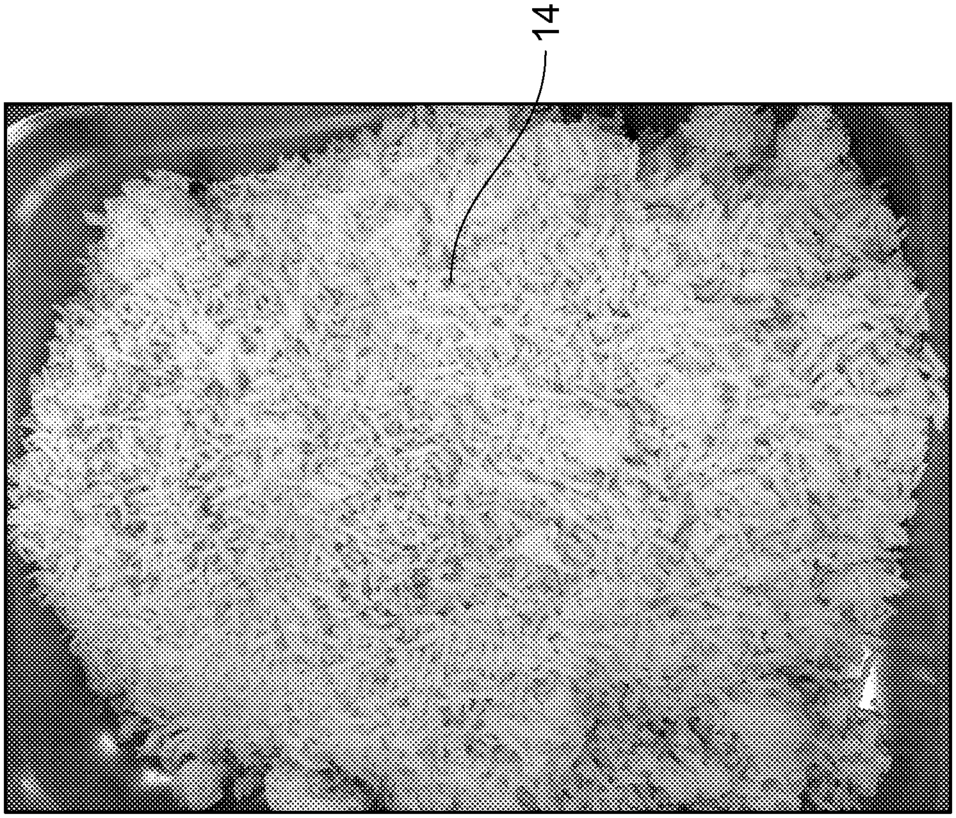

The grain 14 is completely cooked in the sealed bag 12 and is not opened until ready to use. There is no post thermal processing contamination which provides food safety and better refrigerated product shelf life. FIGS. 7 and 8 show loose, fluffy cooked grain and rice made in accordance with the present process.

Many modifications and variations of the present invention are possible in light of the above teachings. It is, therefore, to be understood within the scope of the appended claims the invention may be protected otherwise than as specifically described.

We claim:

1. A process for cooking grains comprising:

a step of providing a bag having an air and moisture barrier;

a step of placing uncooked grains in the bag;

a step of placing brine in the bag;

a step of providing a head space filled with air in the bag to provide space for the grains to expand during cooking;

a step of sealing the bag without application of a vacuum; and, a step of cooking the grains in the bag.

2. The process of claim 1 wherein the step of cooking the grains in the bag comprises submerging the bag in water of sufficient heat to cook the grains.

3. The process of claim 1 wherein the step of cooking the grains in the bag comprises placing the bag on a rack in a cabinet and exposing the bag to steam.

4. The process of claim 1 wherein the step of cooking the grains in the bag comprises placing the bag on a rack in a cabinet and exposing the bag to hot air.

5. The process of claim 1 wherein the step of cooking the grains in the bag comprises placing the bag on a rack in a cabinet and exposing the bag to a water fall of sufficient temperature to cook the grains.

6. The process of claim 1 wherein the step of cooking the grains in the bag comprises placing the bag in a rotating and agitating cooking device.

7. The process of claim 6 wherein the rotating and agitating cooking device is a rotary drum cooker.

8. The process of claim 1 wherein the step of cooking the grains in the bag comprises placing the bag in a continuous cooking system having multiple cooking zones.

9. The process of claim 8 wherein the continuous cooking system has bag flipping capability and further comprises flipping the bag between the cooking zones.

10. The process of claim 1 wherein the grains are completely cooked in the bag and then refrigerated in the bag.

11. The process of claim 1 wherein the grains are rice.

12. The process of claim 1 wherein the grains are oats.

13. The process of claim 1 wherein the steps of placing uncooked grains in the bag, placing brine in the bag, providing a head space filled with air in the bag to provide space for the grains to expand during cooking, and sealing the bag are performed in a packaging machine.

14. A process for cooking grains in a bag to provide a cooked grain product comprising:

a step of providing a packaging machine;

a step of providing a bag having an air and moisture barrier;

a step of filling a portion of the bag with a grain using the packaging machine;

a step of filling a portion of the bag with brine using the packaging machine;

a step of leaving a portion of the bag with only air; and, a step of sealing the bag using the packaging machine without application of a vacuum.

15. The process of claim 14 further comprising:

providing a cooking device; and, cooking the grain in the bag in the cooking device.

16. The process of claim 15 wherein the step of providing a cooking device includes providing a rotating cooking device.

17. The process of claim 15 wherein the step of providing a cooking device includes providing a continuous cooking device with multiple cooking zones.

18. The process of claim 15 wherein the step of providing a cooking device includes providing a cabinet with racks for one of cooking by steam, hot air and a hot water fall sufficient to cook the grains.

19. The process of claim 14 wherein the step of filling a portion of the bag with a grain using the packaging machine includes filling the bag with rice.

20. The process of claim 14 wherein the step of filling a portion of the bag with a grain using the packaging machine includes filling the bag with oats.

* * * * *